March 26, 1957 R. H. ECKART 2,786,565
CONVEYOR SYSTEM FOR WOODWORKING MACHINES
Filed Oct. 15, 1954 4 Sheets-Sheet 1

Robert H. Eckart
INVENTOR.

BY *Attorneys*

March 26, 1957 R. H. ECKART 2,786,565
CONVEYOR SYSTEM FOR WOODWORKING MACHINES
Filed Oct. 15, 1954 4 Sheets-Sheet 2
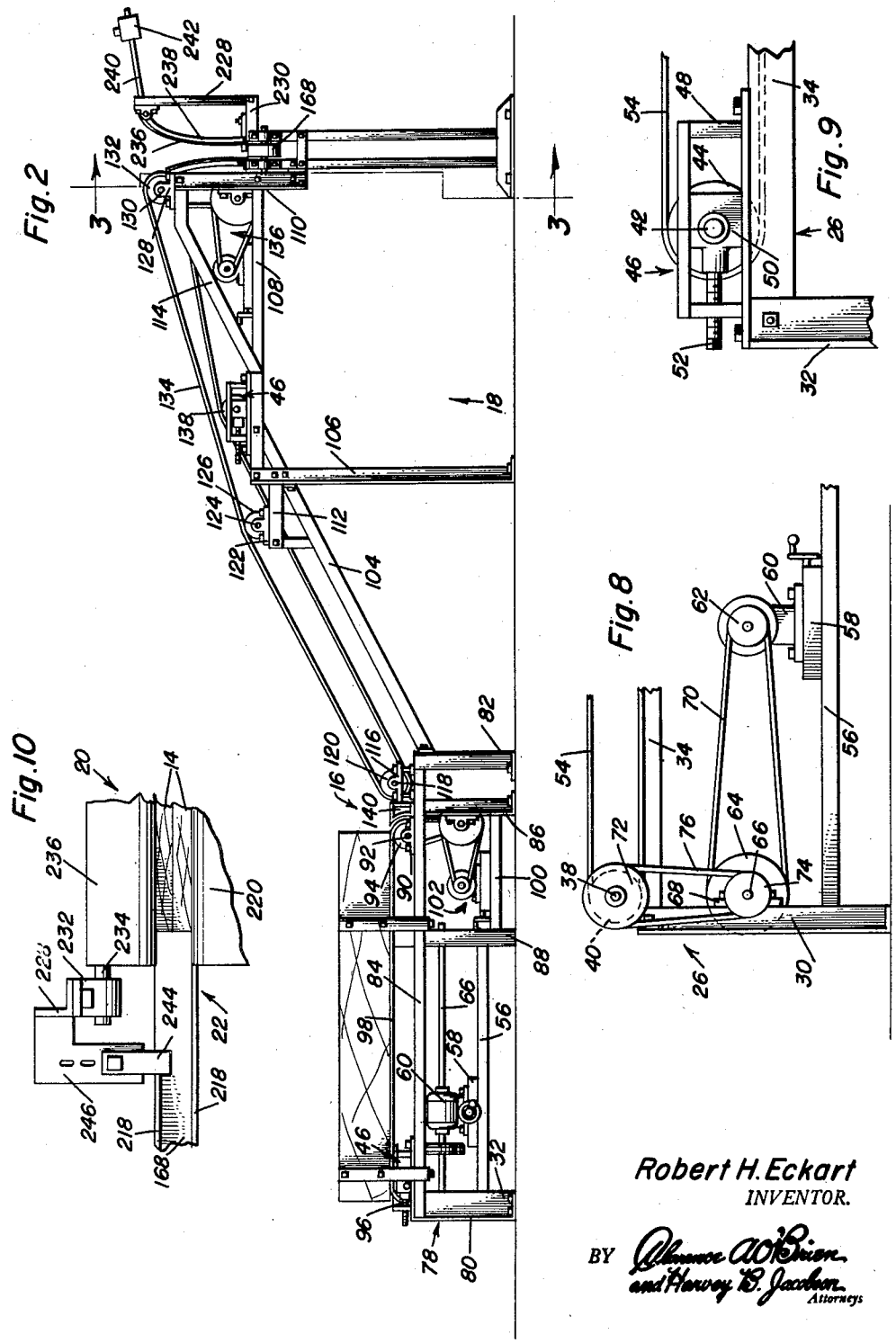
Robert H. Eckart
INVENTOR.

March 26, 1957 R. H. ECKART 2,786,565
CONVEYOR SYSTEM FOR WOODWORKING MACHINES
Filed Oct. 15, 1954 4 Sheets-Sheet 3
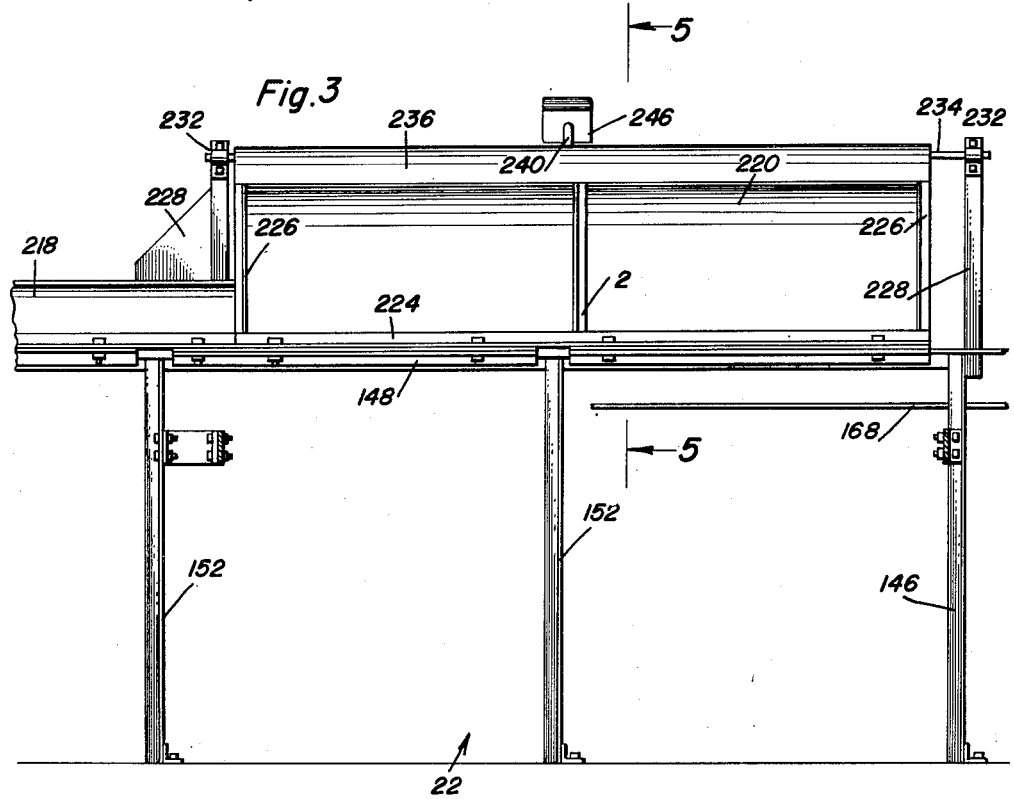
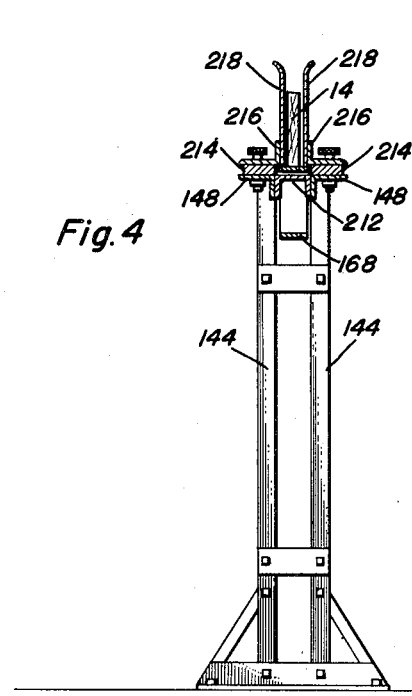
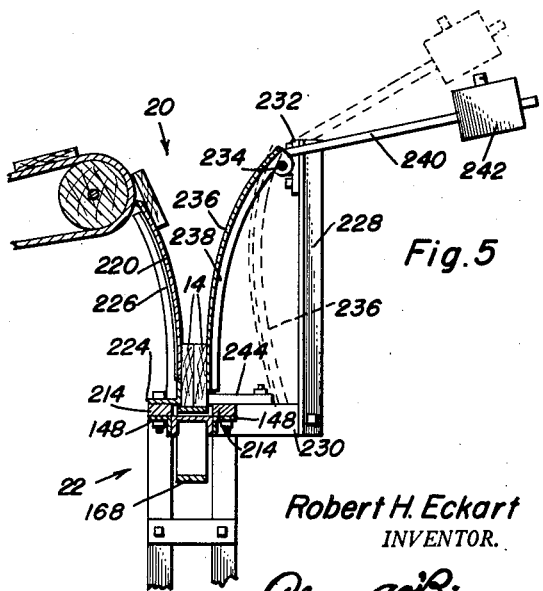
Robert H. Eckart
INVENTOR.

March 26, 1957  R. H. ECKART  2,786,565
CONVEYOR SYSTEM FOR WOODWORKING MACHINES
Filed Oct. 15, 1954  4 Sheets-Sheet 4
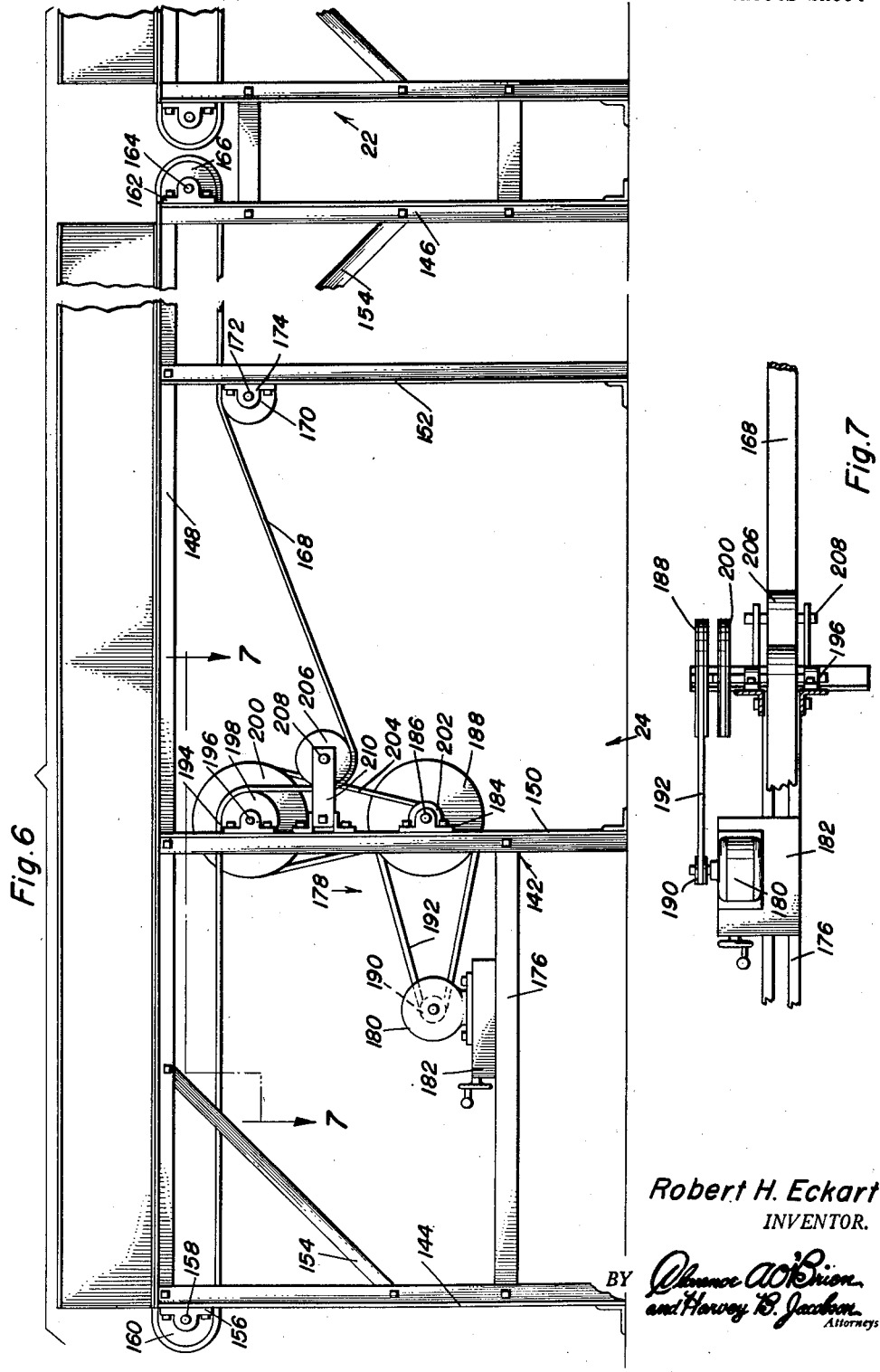
Robert H. Eckart
INVENTOR.

United States Patent Office 2,786,565
Patented Mar. 26, 1957

2,786,565

CONVEYOR SYSTEM FOR WOODWORKING MACHINES

Robert H. Eckart, Corydon, Ind., assignor to The Keller Manufacturing Company, Corydon, Ind., a corporation of Indiana Application October 15, 1954, Serial No. 462,411

7 Claims. (Cl. 198—33)

This invention relates in general to new and useful improvements in conveyor systems, and more specifically to an improved conveyor system for use in combination with woodworking machines.

In a mill, boards or lumber are first fed into a planer or surfacer where the upper and lower faces thereof are planed as necessary. Then, it is necessary for the boards or lumber to be transported from the planer or surfacer to a jointer so that the edges thereof may be properly surfaced. However, the lumber passes through the planer or surfacer in a flat or horizontal position and must pass through the jointer in a vertical or on-edge position. In order to accomplish this, it is necessary to either manually feed the boards or lumber into the jointer or to provide a suitable conveyor system for accomplishing this desired result.

It is therefore the primary object of this invention to provide an improved conveyor system which is so constructed and arranged whereby it will receive boards continuously from a planer or surfacer and elevate and carry such boards to the feeding end of a jointer, the boards being rotated during their travel so as to be disposed in an on-edge position when being fed into the jointer.

Another object of this invention is to provide an improved conveyor system for conveying and turning boards from a flat state to an on-edge state, the conveyor system including a hopper for receiving boards from a conveyor while in a flat state and for feeding the boards onto another conveyor while in an on-edge position.

Still another object of this invention is to provide an improved conveyor system which includes a plurality of conveyors which are so arranged and which have relative speeds of such a nature whereby boards will be properly aligned on the conveyor, irrespective of the general position in which they are initially placed on a receiving one of the conveyors.

A further object of this invention is to provide an improved hopper for turning and transferring boards from a first conveyor to a second conveyor, the hopper being so constructed whereby a single board is fed onto the second conveyor and being of such a nature whereby overloading of the hopper will result in the dumping of the excess boards out of the hopper to one side of the second conveyor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an end elevational view of the conveyor system and shows the specific structure of two of the conveyors;

Figure 3 is an enlarged fragmentary vertical sectional view taken substantially upon the plane indicated by the section line 3—3 of Figure 2 and shows an elevational view of the hopper;

Figure 4 is an enlarged fragmentary transverse vertical sectional view through one of the hoppers and shows the general arrangement of guide means thereof with respect to its conveyor belt;

Figure 5 is an enlarged fragmentary vertical sectional view taken substantially upon the plane indicated by the section line 5—5 of Figure 3 and shows the general details of the hopper, a board dumping position of a movable wall of the hopper being shown in dotted lines;

Figure 6 is an enlarged fragmentary elevational view and shows the details of a feeding conveyor and its relationship to another of the conveyors;

Figure 7 is an enlarged fragmentary horizontal sectional view taken substantially upon the plane indicated by the section line 7—7 of Figure 6 and shows the details of the drive means for the conveyor of Figure 6.

Figure 8 is a fragmentary side elevational view of the board receiving conveyor and shows the details of the drive thereof;

Figure 9 is an enlarged fragmentary elevational view of the conveyor belt tensioning means of the board receiving conveyor and taken along the line 9—9 of Figure 1; and Figure 10 is an enlarged fragmentary top plan view showing the details of mounting of one end of the movable wall of the hopper and the adjustable mounting of a board limiting stop.

Figure 1:
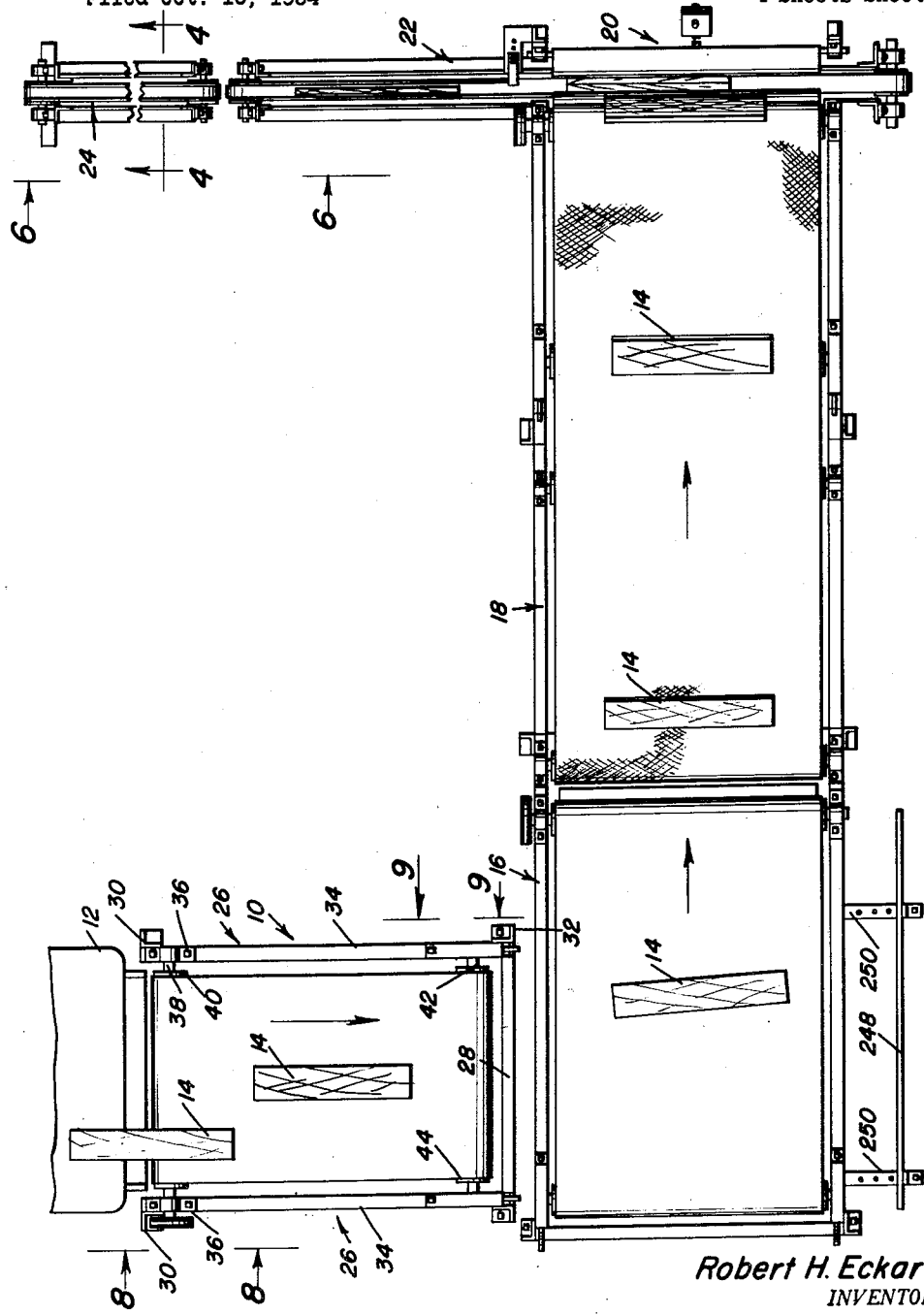
Figure 1 is a general plan view of the conveyor system which is the subject of this invention and shows the general arrangement of the various individual conveyors thereof.

Referring now to the drawings in detail, it will be seen that there is illustrated the general arrangement of the conveyor system which is the subject of this invention. The conveyor system includes a board receiving conveyor, which is referred to in general by the reference numeral 10. The board receiving conveyor 10 is disposed adjacent the exit end of a conventional surfacer or planer 12 and receives boards therefrom which have had their upper and lower flat faces properly surfaced, the boards being referred to by the reference numeral 14.

Disposed at the end of the board receiving conveyor 10 remote from the planer 12 is an intermediate conveyor which is referred to in general by the reference numeral 16. The intermediate conveyor 16 is disposed normal to the axis of the receiving conveyor 10 and is intended to receive boards therefrom to change the direction of movement of such boards. Disposed in alignment with the intermediate conveyor 16 is an elevating conveyor 18. The elevating conveyor 18 has disposed at its end remote from the intermediate conveyor 16 an elevated hopper which is referred to in general by the reference numeral 20.

The hopper 20 is intended to rotate a board 14 from a flat position to a vertical on-edge position and has underlying the same a conveyor 22. The conveyor 22 has disposed in alignment therewith a conveyor 24, the conveyor 24 being a feeding conveyor for a jointer (not shown). It is to be noted that the conveyors 10, 16 and 18, which receive the boards 14 in their flat state, are relatively wide, whereas the conveyors 22 and 24, which receive the boards 14 in their on-edge positions, are relatively narrow.

Referring now to Figures 1 and 8 in particular, it will be seen that the receiving conveyor 10 is provided at opposite sides thereof with side frames 26 which are joined together at their ends remote from the planer 12 by transverse frame members 28. Each of the side frames 26 includes a pair of corner posts 30 and 32 connected together at their upper ends by a longitudinal frame member 34.

Carried by the upper side of each of the longitudinal frame members 34 adjacent its intersection with the leg 30 is a pillow block 36 which have extending therebetween and rotatably journaled therein a transverse shaft 38. Secured to the shaft 38 for rotation therewith is a drive roller 40. It is to be noted that the shaft 38 extends through and outwardly of the pillow block 36 disposed on the left side frame 26, as viewed in Figure 1.

Disposed adjacent the opposite end of the receiving conveyor 10 is a transverse idler shaft 42 which has secured thereto an idler roller 44. As is best illustrated in Figure 9, the shaft 42 is mounted for longitudinal adjustable movement in an adjustable pillow block assembly, which is referred to in general by the reference numeral 46, there being a pillow block assembly 46 for each of the side frames 26. Each of the pillow block assemblies 46 includes a guide frame 48 suitably secured to its associated longitudinal frame member 34. Slidably mounted in the guide frame 48 is an adjustable pillow block 50 which has connected thereto an adjusting screw 52. Entrained over the drive roller 40 and the idler roller 44 is an endless conveyor belt 54 which may be adjustably tensioned by the use of the pillow block assemblies 46.

Referring once again to Figure 8 in particular, it will be seen that carried by the planer ends of the side frames 26 beneath the conveyor belt 54 is a platform 56. Secured to the platform 56 remote from the legs 30 is an adjustable base 58 which carries for longitudinal adjustable movement a motor 60. The motor 60 includes a drive pulley 62 longitudinally aligned with a driven pulley 64. The driven pulley 64 is carried by a shaft 66 suitably journaled in the pillow blocks 68 carried by the legs 30. The adjustable pulley 62 is of the variable pitch type so that movement of the motor 60 relative to the shaft 66 will result in the increase or decrease in tension on a drive belt 70 entrained over the pulleys 62 and 64 to vary the effective size of the pulley 64 whereby the speed of the conveyor belt 64 may be varied as desired.

Carried by the outwardly projecting extension of the drive shaft 38 is a pulley 72 which is in vertical alignment with a pulley 74 carried by the outer end of the shaft 66. Entrained over the pulleys 72 and 74 is a drive belt 76 to permit driving of the conveyor belt 54 by the motor 60.

Referring now to Figure 2 in particular, it will be seen that the intermediate conveyor 16 includes a pair of side frames which are referred to in general by the reference numeral 78. Each of the side frames 78 includes a pair of legs 80 and 82 at opposite ends thereof which are connected together at their upper ends by a longitudinal frame member 84. Depending downwardly from the longitudinal frame members 84 adjacent the legs 82 are intermediate legs 86 and 88.

Carried by the longitudinal frame members 84 in transverse alignment adjacent the intermediate legs 86 are pillow blocks 90 in which is rotatably mounted a shaft 92 carrying a drive roller 94.

An idler roller 96 is suitably mounted in one of the adjustable pillow block assemblies 46 carried by each of the longitudinal frame members 84 adjacent the legs 80. Trained over the rollers 94 and 96 is an endless conveyor belt 98.

Extending between the legs 88 and 86 and supported thereby is a platform 100. Mounted on the platform 100 and carried by the legs 86 is a drive train which is referred to in general by the reference numeral 102. The drive train is identical with the drive train of Figure 8 and need not be described in more detail here.

The conveyor 18 includes a frame which is an extension of the frame of the conveyor 16. Associated with each of the side frames 78 is an upwardly sloping frame member 104 whose upper end is connected to a relatively long leg 106 adjacent the upper end thereof. Extending horizontally from the upper end of the leg 106 is a longitudinal frame member 108 which, in turn, is connected to an intermediate portion of an end leg 110 which is longer than the leg 106. Carried by the frame member 104 immediately adjacent the leg 106 and partially connected thereto is a mounting bracket 112. A similar mounting bracket 114 is carried by the frame member 108 and the leg 110.

Secured to the frame members 84 adjacent the legs 82 in spaced relation thereto are pillow blocks 116 which support an idler shaft 118. Carried by the idler shaft 118 is a roller 120. Another pair of pillow blocks 122 are carried by the mounting bracket 112. Journaled in the pillow blocks 122 is an idler shaft 124 carrying an idler roller 126. Secured to the mounting brackets 114 are transversely aligned pillow blocks 128 which have journaled therein a drive shaft 130. Carried by the drive shaft 130 is a drive roller 132.

Entrained over the rollers 120 and 132 is an endless conveyor belt 134. The conveyor belt 134 is driven by a drive train 136 which is identical with the drive train of Figure 8. The conveyor belt 134 has the upper portion in engagement with the roller 126. The conveyor belt 134 is also tensioned by an idler roller 138 which is carried by a pair of adjustable pillow block assemblies 46 which are mounted on the frame members 108 adjacent the legs 106.

In order to permit the convenient transfer of a board 14 from the conveyor belt 98 to the conveyor belt 134, there is disposed between the opposed ends of the conveyor belts 98 and 104 a filler block 140. The filler block 140 extends transversely of and is secured to the frame members 84.

Referring now to Figure 6 in particular, it will be seen that the feeder conveyor 24 includes a pair of side frame members which are referred to in general by the reference numeral 142. Each of the side frame members 142 includes spaced end legs 144 and 146 whose upper ends are connected together by a longitudinal frame member 148. Also secured to the longitudinal frame member 148 and extending downwardly from intermediate portions thereof are intermediate legs 150 and 152. The legs 144 and 146 are secured to the longitudinal frame members 148 by suitable braces 154.

Carried by the upper ends of the legs 144 are vertically disposed pillow blocks 156. The pillow blocks 156 have suitably journaled therein a transverse shaft 158 which carries a roller 160. A similar pair of pillow blocks 162 are secured to the legs 146 and have journaled therein a shaft 164. Carried by the shaft 164 is a roller 166. Entrained over the rollers 166 and 160 is an endless conveyor belt 168. The bottom portion of the conveyor belt 168 also is entrained over a roller 170 carried by a shaft 172. The shaft 172 is journaled in pillow blocks 174 carried by the legs 152 adjacent the upper ends thereof.

Extending between the lower portions of the legs 144 and 150 is a platform 176. Secured to the platform 176 and to the legs 150 is a drive train which is referred to in general by the reference numeral 178. The drive train includes an electric motor 180 carried by an adjustable mounting block 182. Secured to the legs 150 are transversely aligned pillow blocks 184 in which is journaled the shaft 186 having mounted thereon an adjustable pulley 188. Entrained over the pulley 188 and an aligned pulley 190 of the electric motor 180 is a drive belt 192 which may be selectively tensioned in order to vary the effective diameter of the pulley 190.

Carried by the legs 150 above the pillow blocks 184 are pillow blocks 194. The pillow blocks 194 have journaled therein a transverse shaft 196 carrying a drive roller 198 for the conveyor belt 168. A drive shaft 196 also includes a drive pulley 200 which is aligned with a pulley 202 on the shaft 186. A drive belt 204 is entrained over the pulleys 200 and 202.

In order to retain the conveyor belt 168 in engagement with the roller 198, there is provided an idler roller 206. The idler roller 206 is carried by a shaft 208 suitably mounted between mounting brackets 210 which are secured to the legs 150 intermediate the pillow blocks 184 and 194.

Referring now to Figure 4 in particular, it will be seen that the longitudinal frame members 148 are connected together by a spacer 212 which underlies the upper portion of the conveyor belt 168. Further, secured to the frame members 148 in overlying relation are spacers 214 which are disposed in generally the same plane as the upper portion of the conveyor belt 168. Overlying the spacers 214 are angle brackets 216 which secure in place a pair of longitudinally extending, transversely spaced parallel guide plates 218. The guide plates 218 extend vertically above the conveyor belt 168 and serve to retain a board 14 in a vertical on-edge position supported by the conveyor belt 168.

The conveyor 22 is identical in structure with the conveyor 24 with the exception that the conveyor 22 may be of a greater length than the conveyor 24 and will include a plurality of additional intermediate legs 152. The legs 152 will be provided with a conveyor belt supporting roller only if deemed necessary.

From the drawings, it will be readily apparent that the hopper 20 is carried by the supporting frame of the conveyor 22. The hopper 20 includes a fixed wall 220 which curves upwardly and outwardly from the conveyor belt 168 of the conveyor 22 and is at its lower portion a continuation of one of the guides 218 of the conveyor 22. The fixed wall 220 is provided at its lower end with an outturned flange 224 which is secured in overlying relation to an adjacent spacer 214. The fixed wall 220 is braced at selected intervals by braces 226 secured to the outer surface thereof.

The hopper 20 also includes a pair of relatively long legs 228 spaced longitudinally of the conveyor 22 and disposed at opposite ends of the hopper 20. The legs 228 are spaced outwardly from the frame of the conveyor 22 and are connected thereto by brackets 230.

Carried by upper ends of the legs 228 are pillow blocks 232 in which is journaled a longitudinally extending shaft 234. The shaft 234 has pivotally mounted thereon a movable wall 236 of the hopper 20. The movable wall 236 curves upwardly and outwardly away from the fixed wall 220 and is braced at suitable intervals by reinforcing strips 238.

In order that the movable wall 236 may be normally urged toward the fixed wall 220, there is secured to the upper portion thereof an outwardly extending arm 240 on which there is adjustably mounted a weight 242. The weight 242 tends to pivot the movable wall 236 in a clockwise direction so that the lower end thereof is normally urged toward the lower end of the fixed wall 220. In this manner, a board 14 disposed in the hopper 20 will always be urged toward the fixed wall 220 so that it will move down between the guides 218 of the conveyor 22.

In order to assure that only one board 14 at a time will pass through the conveyor 22, there is provided a stop member 244 at the exit end of the hopper 20. The stop member 244 is adjustably carried by an arm 246 which, in turn, is secured to an adjacent one of the legs 228. It will be seen that the stop member 244 is spaced from the guide 218 which is a continuation of the fixed wall 220 a distance only to permit the advance of a single board 14 at a time.

While the main purpose of the hopper 20 is to permit only one board at a time to move along the conveyor 22 and to rotate the boards 14 from a flat position to a vertical on-edge position, it is another object of the hopper 20 to prevent overloading. This is accomplished because of the movable wall 236. When an excessive number of boards 14 drops into the hopper 20 at one time, they will force the movable wall 236 outwardly to its dotted line position so that it no longer overlies the conveyor belt 168. This will result in the dumping of the boards 14 off the conveyor belt 168 onto the adjacent supporting surface or floor.

Referring now to Figure 1 once again, it will be seen that the boards 14 enter the conveyor system from the planer 12 onto the receiving conveyor 10. Inasmuch as the boards 14 may exit from the planer at an angle to the longitudinal axis of the receiving conveyor 10, they are often deposited on the intermediate conveyor 16 at a slight angle. Also, because the intermediate conveyor 16 is disposed at an angle to the receiving conveyor 10, there is a tendency for the boards 14 to be twisted as they move from the receiving conveyor 10 onto the intermediate conveyor 16. This is minimized by both elevating the receiving conveyor 10 above the intermediate conveyor 16 so that the boards 14 drop at the last moment onto the intermediate conveyor 16 and by greatly reducing the speed of the intermediate conveyor 16 with respect to the receiving conveyor 10.

In order that the boards 14 passing onto the elevating conveyor 18 may be straightened for proper reception into the hopper 20, the elevating conveyor 18 is run at a slower speed than the intermediate conveyor 16. In order to prevent overlapping of boards 14, the elevating conveyor 18, as is best illustrated in Figure 2, has the first portion thereof disposed at a very sharp angle. The angle is of such a nature that when two boards 14 are disposed in overlying relation, the uppermost board will slide off the lowermost board 14 and assume its natural sequence on the conveyor 18.

In order to prevent congestion in the hopper 20, the conveyor 22 will be of a slightly greater speed than the elevated conveyor 18. Further, the conveyor 24 may have a greater speed than the conveyor 22, if desired.

In order to prevent the accidental falling off of boards 14 from the intermediate conveyor 16, there is provided a stop board 248. The stop board 248 is supported from the frame of the intermediate conveyor 16 by suitable arms 250.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A conveyor system for transporting flat members from a flat exiting position from a first machine to an on-edge entrance position for a second machine, said conveyor system comprising a plurality of conveyors including a receiving conveyor and a feeding conveyor, a vertical hopper overlying one of said plurality of conveyors for receiving members in a vertical position, another of said plurality of conveyors terminating at an upper edge of said hopper, said hopper having a fixed wall and a movable wall whereby said hopper may receive at one time at least two of said members in face-to-face relation.

2. A conveyor system for transporting flat members from a flat exiting position from a first machine to an on-edge entrance position for a second machine, said conveyor system comprising a plurality of conveyors including a receiving conveyor and a feeding conveyor, a vertical hopper overlying one of said plurality of conveyors for receiving members in a vertical position, another of said plurality of conveyors terminating at an upper edge of said hopper, said hopper having a fixed wall and a movable wall whereby said hopper may receive at one time at least two of said members in face-to-face relation, said hopper being provided with stop means for limiting the exiting of members on said one conveyor to one at a time.

3. A conveyor system for transporting flat members from a flat exiting position from a first machine to an on-edge entrance position for a second machine, said conveyor system comprising a plurality of conveyors including a receiving conveyor and a feeding conveyor, a vertical hopper overlying one of said plurality of conveyors for receiving members in a vertical position, another of said plurality of conveyors terminating at an upper edge of said hopper, said hopper having a fixed wall and a movable wall whereby said hopper may receive at one time at least two of said members in face-to-face relation, said movable wall normally overlying said one conveyor and being movable by an excessive number of said members out of alignment with said one conveyor to dump excessive ones of said members.

4. A conveyor system for transporting flat members from a flat exiting position from a first machine to an on-edge entrance position for a second machine, said conveyor system comprising a plurality of conveyors including a receiving conveyor and a feeding conveyor, a vertical hopper overlying one of said plurality of conveyors for receiving members in a vertical position, another of said plurality of conveyors terminating at an upper edge of said hopper, said hopper having a fixed wall and a movable wall whereby said hopper may receive at one time at least two of said members in face-to-face relation, counterbalance means connected to and urging said movable wall towards said fixed wall.

5. A conveyor system for transporting flat members from a flat exiting position from a first machine to an on-edge entrance position for a second machine, said conveyor system comprising first and second conveyors disposed normal to each other, said first conveyor being elevated relative to said second conveyor, a hopper overlying said second conveyor and aligned with an end of said first conveyor, said first conveyor terminating at an upper edge of said hopper, said hopper being expandable to receive a plurality of overlapping flat members, said hopper being provided with stop means for limiting the exiting of members on said second conveyor to one at a time.

6. A conveyor system for transporting flat members from a flat exiting position from a first machine to an on-edge entrance position for a second machine, said conveyor system comprising first and second conveyors disposed normal to each other, said first conveyor being elevated relative to said second conveyor, a hopper overlying said second conveyor and aligned with an end of said first conveyor, said first conveyor terminating at an upper edge of said hopper, said hopper having a fixed wall and a movable wall whereby said hopper may receive at one time at least two of said members in face-to-face relation.

7. A conveyor system for transporting flat members from a flat exiting position from a first machine to an on-edge entrance position for a second machine, said conveyor system comprising a plurality of conveyors including a receiving conveyor and a feeding conveyor, a vertical hopper overlying one of said plurality of conveyors for receiving members in a vertical position, another of said plurality of conveyors terminating at an upper edge of said hopper, said hopper having a fixed wall and a movable wall whereby said hopper may receive at one time at least two of said members in face-to-face relation, said movable wall normally overlying said one conveyor and being movable by an excessive number of said members out of alignment with said one conveyor to dump excessive ones of said members, said hopper being provided with stop means for limiting the exiting of members on said one conveyor to one at a time.

References Cited in the file of this patent

UNITED STATES PATENTS

| Number | Name | Date |
|---|---|---|
| 1,160,792 | Van Houten | Nov. 16, 1915 |
| 1,199,818 | Peck | Oct. 3, 1916 |
| 1,559,200 | Straight | Oct. 27, 1925 |
| 1,696,715 | Huddleston | Dec. 25, 1928 |
| 1,774,047 | Wharton | Aug. 26, 1930 |
| 2,015,187 | Mayer | Sept. 24, 1935 |
| 2,541,300 | Silva | Feb. 13, 1951 |